United States Patent
Ghodsnia et al.

(10) Patent No.: US 9,594,781 B2
(45) Date of Patent: Mar. 14, 2017

(54) ESTIMATION OF QUERY INPUT/OUTPUT (I/O) COST IN DATABASE

(71) Applicants: Pedram Ghodsnia, Waterloo (CA); Ivan Bowman, Waterloo (CA)

(72) Inventors: Pedram Ghodsnia, Waterloo (CA); Ivan Bowman, Waterloo (CA)

(73) Assignee: SYBASE, INC., Dublin, CA (US)

( * ) Notice: Subject to any disclaimer, the term of this patent is extended or adjusted under 35 U.S.C. 154(b) by 322 days.

(21) Appl. No.: 14/301,160

(22) Filed: Jun. 10, 2014

(65) Prior Publication Data

US 2015/0149418 A1 May 28, 2015

Related U.S. Application Data

(60) Provisional application No. 61/909,927, filed on Nov. 27, 2013.

(51) Int. Cl.
*G06F 17/30* (2006.01)

(52) U.S. Cl.
CPC ............................. *G06F 17/30306* (2013.01)

(58) Field of Classification Search
USPC .............................. 707/688, 713, 718, 719
See application file for complete search history.

(56) References Cited

U.S. PATENT DOCUMENTS

| | | | | |
|---|---|---|---|---|
| 5,412,806 A | * | 5/1995 | Du | G06F 17/30545 |
| 6,577,600 B1 | * | 6/2003 | Bare | H04M 15/8016 |
| | | | | 370/238 |
| 9,354,813 B1 | * | 5/2016 | Dolan | G06F 3/0655 |
| 2012/0066449 A1 | * | 3/2012 | Colgrove | G06F 3/061 |
| | | | | 711/114 |
| 2013/0232176 A1 | * | 9/2013 | Plattner | G06F 17/30286 |
| | | | | 707/803 |

* cited by examiner

*Primary Examiner* — Hung T Vy
(74) *Attorney, Agent, or Firm* — Sterne, Kessler, Goldstein & Fox P.L.L.C.

(57) ABSTRACT

Disclosed herein are system, method, and computer program product embodiments for calibrating and using a stable storage model. An embodiment operates by generating, by a central computer, an access request for a stable storage, wherein the access request comprises a plurality of page accesses; measuring a cost to execute the access request on the stable storage; amortizing the cost over the plurality of page accesses; and calibrating, by the central computer, a stable storage model based on the amortized cost.

20 Claims, 8 Drawing Sheets

ESTIMATION OF QUERY INPUT/OUTPUT (I/O) COST IN DATABASE

CROSS-REFERENCE TO RELATED APPLICATION(S)

The present application claims the benefit of U.S. Provisional Application No. 61/909,927, filed Nov. 27, 2013, which is incorporated herein by reference in its entirety.

BACKGROUND

Commercial database systems allow multiple users to store data and access the stored data simultaneously. Commercial database systems typically use storage devices (stable storage) to persistently store the database data and they use dynamic memory to hold data that is currently being used, or has recently been used. To answer (or "execute") a specific query that is issued to database system, there are usually several different conventional approaches available. These approaches are commonly termed "execution plans," which are a series of operations that provide an answer to the specific query.

Each execution plan is built from execution operators that logically implement a relational-algebra concept with a particular algorithm. A traditional query optimizer in a database system estimates the cost of different possible execution plans and typically chooses the one with the lowest estimated cost. There are various costs associated with each possible execution plan for the query that can be taken into account. Generally, one significant cost is the time it takes to read data from stable storage into memory, or to write the data from memory to stable storage. Improving the accuracy of the estimation of this cost improves the overall accuracy of the decisions made by the query optimizer in selecting the execution plan.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for estimating the cost of input/output (I/O) accesses to stable storage.

Figure 1:
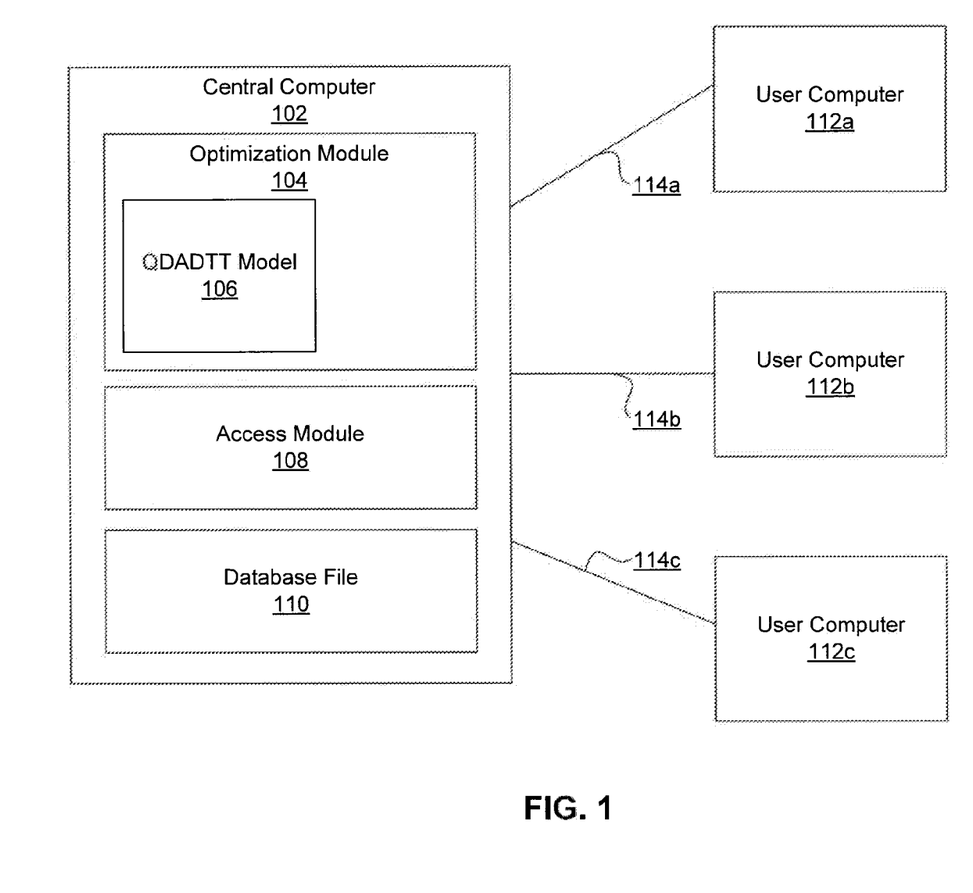
FIG. 1 is a block diagram of a database system that includes a storage unit accessible by multiple computer systems, according to an example embodiment.

FIG. 1 shows a computer system 100 in which embodiments described herein can be implemented. In an embodiment, computer system 100 includes a central computer 102 coupled to one or more computers 112a-c via connections 114a-c. For ease of discussion, three computers (e.g., computers 112a-c) have been illustrated, though any number of computers can be utilized. Moreover, computers 112 may include any number of client devices, and operation as a computer is provided by way of example and not limitation. Computers 112a-c can be connected to the central computer 102 directly or via a network, for example using the Internet or a Local Area Network. In addition, the central computer 102 can be a server.

In an embodiment, central computer 102 can include a database file 110 within a stable storage, an access module 108, and an optimization module 104. Stable storage can be any computer information storage device, for example a hard disk drive, a solid state disk drive, removable storage device (e.g., flash disk drives), etc. Computer databases, for example, database file 110, are a mechanism for storing information on stable storage on a computer system while providing easy access to the data for example, by computers 112a-c. In an embodiment, database file 110 can be stored as a series of pages on a stable storage. Different embodiments can have different page sizes. In an embodiment, the size of a page for database file 110 is chosen at the time database file 110 is created. For example, database file 110 can be created with page sizes of 2 KB, 4 KB, 8 KB, 16 KB, 32 KB, etc. The number of pages is based on the size of the database file 110 and the size of the pages. For example, if a database file 110 is 400 KB in size, and the page size was set at 4 KB when database file 110 is created, then database file 110 would consist of 100 pages.

In an embodiment, optimization module 104 can store one or more I/O cost models (e.g., Queue Depth Aware Disk Transfer Time (QDADTT) model 106), which unlike conventional I/O cost models, determines the I/O cost of individual page I/O based on band size and queue depth. The QDADTT model 106, which is described in more detail below, can receive information about an I/O request from a computer, for example computers 112a-c. An I/O request can include one or more requests to either write data to stable storage or read data from stable storage. The information for the I/O request can include, for example, and is not limited to, band size and queue depth. In an embodiment, the band size represents a distance, in number of pages, between adjacent page requests. For example, the band size can represent the maximum number of pages possible between neighboring requests, i.e., the maximum distance between data being retrieved or written by two neighboring requests. In an embodiment, the queue depth represents the average number of outstanding page requests in an I/O queue, also known as I/O access parallelism. The I/O queue maintains al y pending requests that are being processed. For example if 4 requests are currently being handled by the stable storage, all 4 would appear in the I/O queue. The I/O cost model 106 can take, for example, two parameters, such as, the band size and queue depth, to determine the amortized costs of a random I/O within the given band size, when the queue depth of the storage device is equal to queue depth parameter.

QDADTT model 106 can determine and provide an I/O cost, for example, an estimated time for a stable storage to handle a given I/O request.

If optimization module 104 knows the expected band size and queue depth of a specific I/O request, the QDADTT model 106 helps optimization module 104 estimate the I/O cost of the I/O request. The QDADTT model 106 takes the queue depth and band size as input parameters. The QDADTT model 106 returns an estimated amortized cost of reading or writing a single page within the given band size with a given queue depth.

In an example, using the database file 110 described above, the band size could be between 1 and 99. For example, an I/O request could be configured such that any request in the I/O request could access any page in database file 110 with no particular locality of reference. In this example, the maximum distance between pages that need to be read is 99, i.e., if the first read attempts to read from page 1 and the second read attempts to read from page 100. Thus, the band size could be 99 in this example. In another example, if there were other limitations, for example I/O request could only read data from pages 20-60, then the band size could be further reduced, for example to 40. In this case, there is at most a distance of 40 pages between consecutive requests.

When an I/O request is configured such that the database file is read sequentially, the band size is 1. For example, the stable storage may be designed such that that data is read sequentially or the entity generating the requests, for example user computer 112c, could be configured to only make sequential read requests. The band size could be 1 because each page is read, one after the other. For example, page 10 is read, then page 11, then page 12, and so on. In this example, the maximum distance between each lead is 1 page.

I/O access parallelism can be used to accurately model the cost of I/O access for databases. For example, certain stable storage, for example solid state devices (SSDs) or multiple-spindle disk drives can benefit from higher I/O queue depth. For some stable storage, such as hard disk drives (HDDs), moving between cylinders, and thus, between pages, is very expensive. For other stable storage, such as SSDs, there are no moving parts, and thus, moving between pages may be inexpensive. Thus, the physical aspects of a stable storage can also affect the I/O costs of accessing pages. This effect is becoming more pronounced as storage technologies evolve.

In an embodiment, the I/O queue depth of the stable storage (e.g., HDD and SDD) can be increased by issuing multiple I/O requests substantially concurrently or by employing I/O prefetching techniques. In addition, there are multiple other costs, for both HDDs and SSDs, which affect costs, depending on the access method.

In an embodiment, access module 108 is configured to access one or more pages in database file 110 in response to a request, for example from user computers 112a-c. In an embodiment, access module 108 is configured to select a plan execution that defines how pages in database file 110 are to be accessed. Plan executions have distinctive patterns of access to stored data ranging from sequential to random. In an embodiment, the selection of a plan execution can be based on the I/O cost model that represents one or more stable storage.

Figure 2:
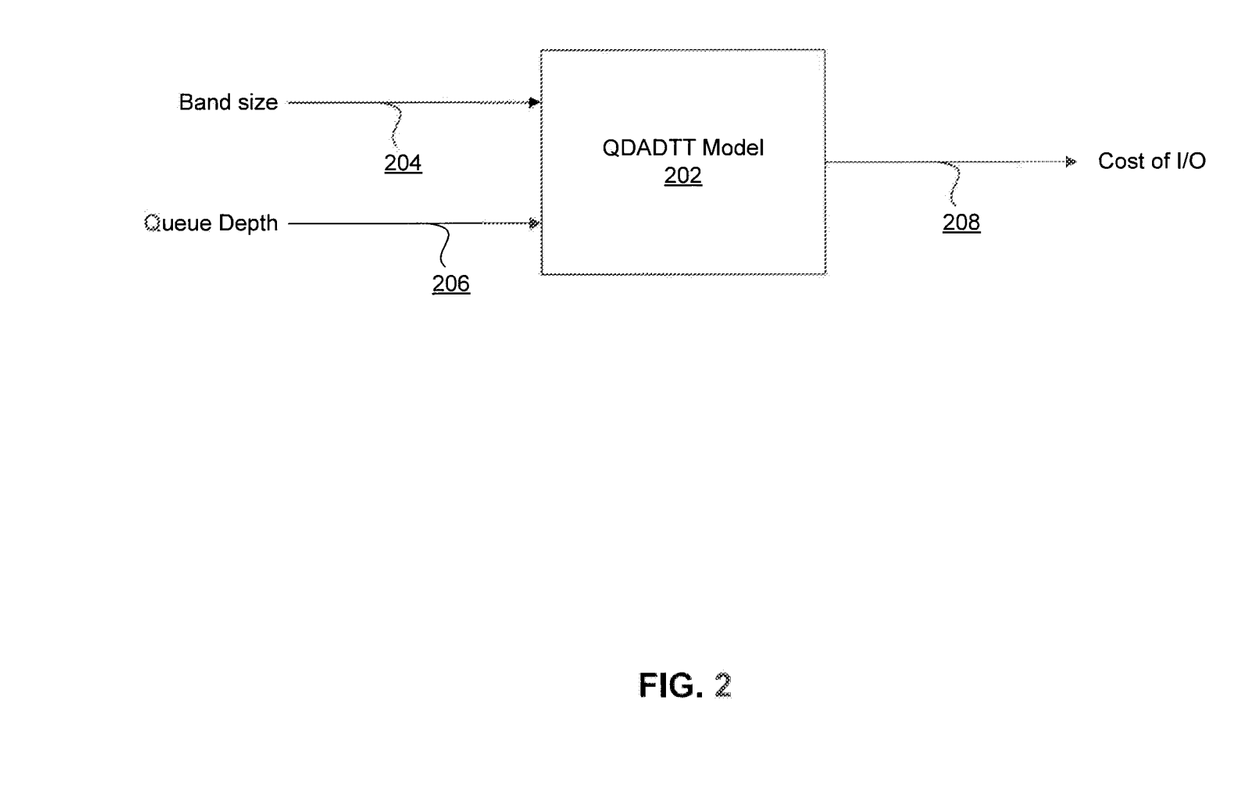
FIG. 2 is a block diagram of a QDADTT model, according to an example embodiment.

FIG. 2 illustrates a QDADTT model 202, for example QDADTT model 106 illustrated in FIG. 1, according to an embodiment. QDADTT model 202 accounts for parallel I/O access when modeling I/O access times for stable storage.

In an embodiment, QDADTT model 202 receives a band size 204 input and a queue depth 206 input. In an embodiment, these inputs may be received from a central computer, for example central computer 102, or they may be received from one or more user computers, for example user computers 112a-c. In an embodiment, QDADTT model 202 returns a cost of I/O 208 of a random I/O request based on band size 204 and queue depth 206 provided. As discussed above, band size 204 represents the maximum number of pages between consecutive I/O requests. Queue depth 206 is the average number of outstanding I/O requests in a I/O queue of the stable storage while a database is executing. The QDADTT model 202 can be used to estimate the I/O cost of an I/O request based on band size 204 and queue depth 206 during the execution of the I/O request.

Figure 3:
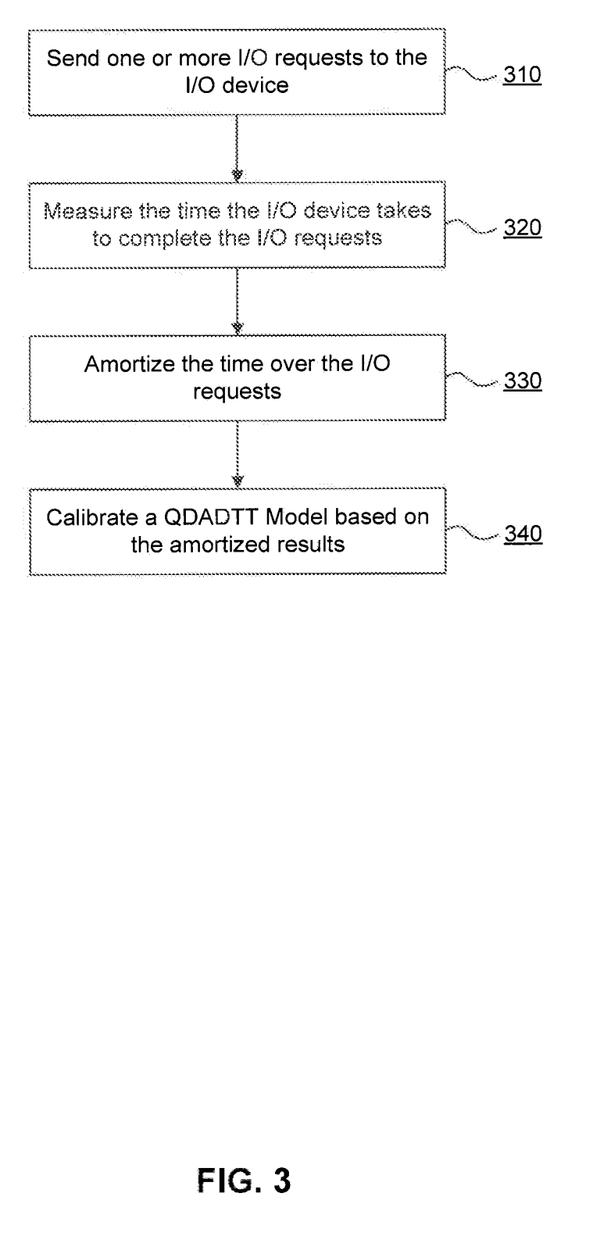
FIG. 3 is a flowchart illustrating a method for calibrating a QDADTT model, according to an example embodiment.

FIG. 3 is a flowchart illustrating a process for calibrating a QDADTT model, according to an example embodiment. As discussed above, a QDADTT model provides an estimate of how long an I/O request will take. In order to accurately provide such an estimate, the QDADTT model needs to be calibrated with information regarding I/O requests of the stable storage it is modeling. FIG. 3 shows an example method 300 for calibrating a QDADTT model, for example QDADTT model 202 illustrated in FIG. 2, using one or more I/O requests. Once the QDADTT model is calibrated, the QDADTT model can be used to estimate the time required to execute an I/O request. Method 300 can be performed by processing logic that can comprise hardware (e.g., circuitry, dedicated logic, programmable logic, microcode, etc.), software (e.g., instructions run on a processing device), or a combination thereof.

In an embodiment, a QDADTT model is built by calibrating the specific characteristics of one or more stable storage storing the database files. For example, a QDADTT model can be calibrated by determining the I/O Request time for one or more queue depth/band width combinations. In an embodiment, calibration is performed in response to a special statement or executed when the database and central computer are quiescent with no other active I/O other than the calibration. In another embodiment, calibration is performed in the background during opportunities when there are periods with few or no other active I/O processes. For example, calibration requests can be ignored if the central computer detects intervening I/O requests that would affect the calibration. In an embodiment, the calibration is "full" if all possible combinations of queue depth and band width are tested.

At operation 310, in an embodiment, an optimization module (e.g., optimization module 104 on central computer 102 illustrated in FIG. 1) sends one or more I/O requests to an I/O device to calibrate the QDADTT model. The optimization module can generate the one or more I/O requests. In an embodiment, the one or more I/O requests can be generated in response to a special calibration statement from the central computer. The one or more I/O requests used to calibrate the QDADTT model can include I/O requests generated by optimization module that include different band sizes and/or different queue depths. The optimization module can create generate I/O requests with I/O patterns having different band sizes and/or queue depths.

In an embodiment, by generating a model of the stable storage, the QDADTT model can more accurately determine the cost of different access methods, for example, index scan and full table scan, for future I/O requests.

In an embodiment, in order to calibrate the QDADTT model artificial I/O patterns are created with different band sizes and queue depths. As described in more detail below, the artificial I/O patterns can be used to select or generate a model of a secure storage.

In an embodiment, queue depth or band sizes can start from 1 and grow exponentially up to a particular number. An example queue depth sequence can be 1, 2, 4, 8, 16, and 32. An example band size sequence can be 1, 200, 400, 800, 3200, etc., one quarter of the database files size, one half of the database file size, the entire database file size. In another embodiment, queue depth or band sizes can start from 1 and grow linearly up to a particular number. An example sequence can be 1, 2, 3, 4, etc. In yet another embodiment, queue depth or band sizes can be an arbitrary arrangement of possible queue depths or band sizes. An example sequence can be 9, 3, 13, 89, 45, etc. The sample band size for calibration can be selected using any specific method, for example, any of the methods described above.

In an embodiment, within each of selected band sizes the I/O requests are created with an average queue depth for each of the selected queue depths. In another embodiment, when calibrating the QDADTT model band sizes and queue depths are randomly paired when generating I/O requests At operation 320, in an embodiment, the optimization module measures the time an I/O device takes to complete one or more of the I/O requests.

At operation 330, in an embodiment, the optimization module amortizes the measured I/O request time to determine the cost of a single page access for one or more band sizes and one or more queue depths. In an embodiment, the optimization module determines the cost of a single page access for each band size and each queue depth measured. In an embodiment, the optimization module determines the cost of a single page access for each band size and each queue depth possible for a stable storage.

The amortized cost of a single page access can be calculated by dividing the total I/O time by total number of page access. In an embodiment, the I/O queue depth is increased by using multiple threads. In an embodiment, each thread issues a synchronous page I/O request. As soon as the synchronous page I/O request finished, the corresponding thread issues another synchronous I/O request. Since the pages are just read (with no processing costs), the CPU time for processing the page is almost zero. Thus, the CPU time is negligible when compared to I/O latency. Therefore, by using N threads, it is possible to keep the average I/O queue depth constantly equal to N. The calibration can be done using any other method in which the average I/O queue depth can be increased to the expected average I/O queue depth for the given calibration point. For example, instead of using multiple threads, a single thread can issue multiple asynchronous I/O requests to increase the I/O queue depth.

At operation 340, in an embodiment, the optimization module calibrates a QDADTT model based on the amortization results from module 330. In an embodiment, the amortization results include at least one result for each combination of band size and queue depth. The QDADTT model can be a lookup table that associates a band size and a queue depth with an amortized I/O cost to access a single page. In an embodiment this calibration comprises storing the identified amortized cost with the associated queue depth/band size entry. Once the QDADTT model is calibrated, the QDADTT model can be used to determine a more accurate estimate of the time to execute an I/O request.

Figure 4:
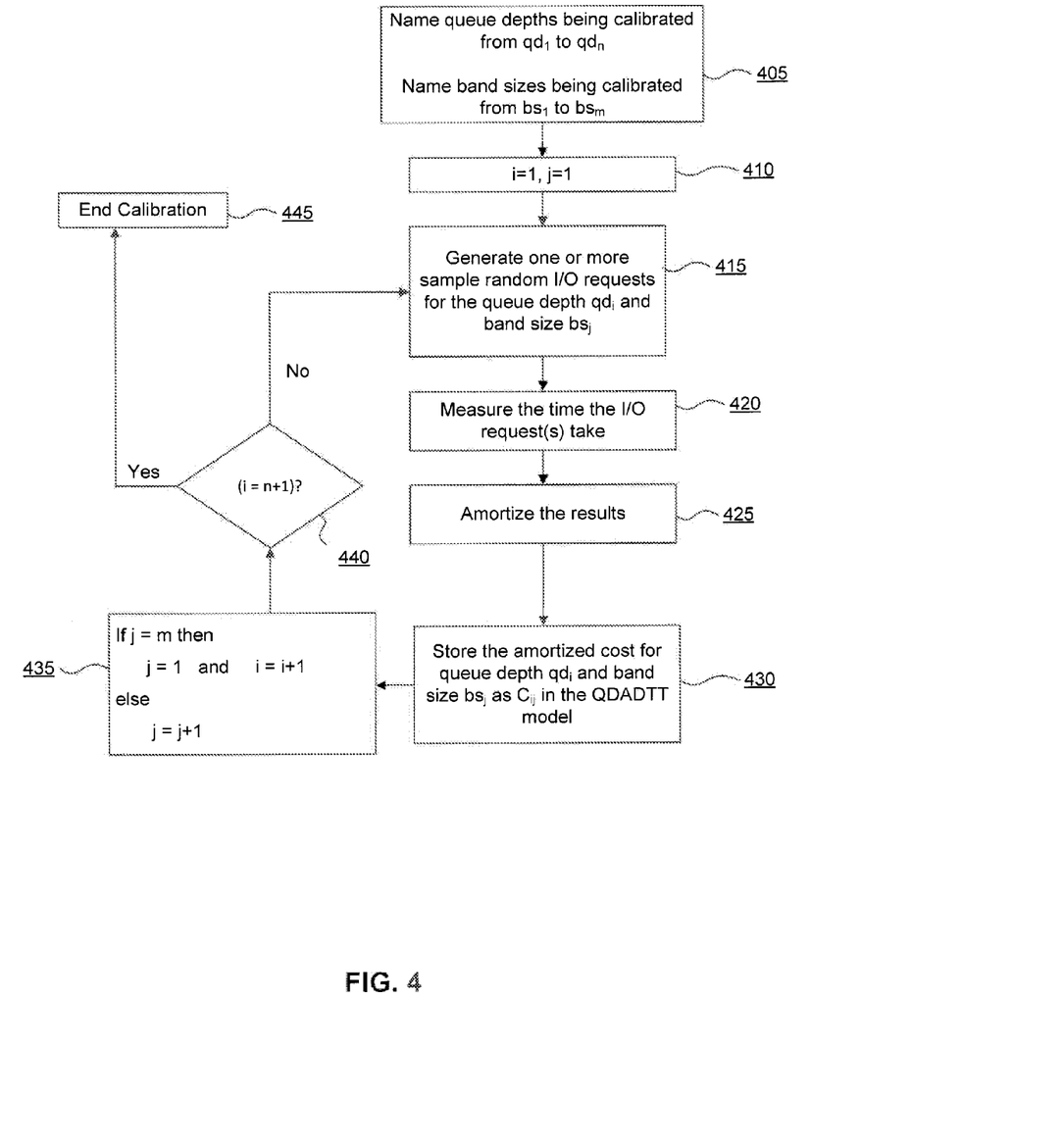
FIG. 4 is also a flowchart illustrating a method for calibrating a QDADTT model, according to an example embodiment.

FIG. 4 is a flowchart illustrating a method for calibrating a QDADTT model, according to an example embodiment. FIG. 4 shows an example method 400 for calibrating a QDADTT model, for example QDADTT model 202 illustrated in FIG. 2, using one or more I/O requests. Once the QDADTT model is calibrated, the QDADTT model can be used to estimate the time required to execute an I/O request. Method 400 can be performed by processing logic that can comprise hardware (e.g., circuitry, dedicated logic, programmable logic, microcode, etc.), software (e.g., instructions ran on a processing device), or a combination thereof.

At operation 405, in an embodiment, an optimization module, for example optimization module 104 on central computer 102 illustrated in FIG. 1, determines and stores the queue depths and band sizes to be calibrated. For example, as illustrated in step 405, one or more queue depths can be received from the central computer and named or placed in a queue depth array, so that they can be easily addressed in the future. And, as illustrated in step 405, one or more band sizes can be received from the central computer and named or placed in a band size an ay, so that they can be easily addressed in the future.

At operation 410, in an embodiment, counters can be initialized. In one embodiment, there is a first counter that has values that correspond to various queue depth sizes, and there is a second counter that has values that correspond to various band sizes. For example, as illustrated in operation 410, two countess can be initialized. Each of the counters can be set to an initial value, for example 1. The values of the first counter (e.g., i) can point to corresponding queue depth sizes, for example, that are stored in the queue depth array. The values for the second counter (e.g., j) can point to corresponding band sizes, for example that are stored in the band size array. For example, when i=1, the first counter may point to the first queue depth size in the queue depth array. In another example, when j=1, the second counter may point to the first band size in the band size array.

At operation 415, in an embodiment, a sample of randomly generated I/O requests can be generated. These I/O requests use a queue depth (e.g., $qd_i$) indicated by the queue size pointed to by the first counter and a band size (e.g., $bs_j$) indicated by the band size pointed to by the second pointer. For example, in the first iteration, as illustrated in FIG. 4, the queue depth will be the first queue depth size received and the band size will be the first band size received. In an embodiment, the sample can be a single I/O request. In another embodiment, the sample can be multiple I/O requests.

At operation 420, in an embodiment, the time to complete each I/O request is measured. In operation 425, in an embodiment, the measured times are amortized. For example, if the queue depth is set to 4, each I/O request would include 4 I/O accesses. The total time required to complete the 4 I/O accesses would then be divided by 4 to generate the amortized execution time.

At operation 430, in an embodiment, the amortized result is stored. The result represents the cost, in time, to execute one or more I/O requests with a queue depth (e.g., $qd_i$) pointed to by the first counter and a band size pointed to by the second counter. By storing the results for the queue depths and the band sizes, an accurate QDADTT model can be generated.

At operation 435, in an embodiment, the counters are incremented. If the second counter has reached a maximum value, for example m in FIG. 4, then the first counter is incremented and the second counter is reset to its initial value, for example 1. If the second counter has not reached the maximum value, the second counter is incremented and the value for the first counter remains the same.

At operation 440, in an embodiment, the first counter is tested to determine if there are other queue depths to be tested. For example, as illustrated in FIG. 4, the first counter can be tested to see if it is equal to one more than the maximum queue depth (e.g., n). If that condition is false, there are additional queue depth/band size combinations to test, and the method returns to operation 415. If that condition is true, then there is not another queue depth and band width combinations to be tested and amortized results have been stored. The calibration can end at operation 445.

In an embodiment, the optimization module reduces the number of calibration points and implements an interpolation method to estimate the value of non-calibrated points when calibrating a QDADTT model. In one embodiment, the interpolation is bilinear interpolation. In bilinear interpolation, a linear interpolation can be done in one dimension (for example, band size) first, and then another linear interpolation can be done on the second dimension (for example, queue depth) over the results of the first linear interpolation. A person skilled in the art would understand that other interpolation methods can be used to estimate the returned cost of the model for a given queue depth and band size for which there is not an explicitly calibrated sample point available.

In one embodiment, there is a control mechanism that stops calibration when continuing calibration is not beneficial. For example, if the stable storage cannot benefit from additional increase in queue depth, the control mechanism can stop the calibration early. The control mechanism works as follows. In an embodiment, the calibration starts from queue depth 1. After calibrating sample band sizes for queue depth 1, calibration starts for the next queue depth (e.g., queue depth 2). In an embodiment, calibration for each queue depth is done from the largest to the smallest band size. After that the calibration of the largest band size in queue depth 2 is finished, the calibration points associated to the largest band size in queue depths 1 and 2 are compared. If increasing queue depth has resulted in at least T percent improvement calibration can continue. Otherwise, calibration is stopped and default values, for example values slightly larger than the measured costs for queue depth 1, are assigned to the remaining calibration points. If calibration did not stop, after calibrating the largest band size in next queue depth, calibration points are checked again. Whenever the stop condition is true, calibration can be stopped and the default values can be assigned for any remaining calibration points.

This approach results in a significant improvement in calibration time especially for stable storage with weak parallel I/O capability. Another benefit of this approach is that it adjusts the calibration runtime dynamically based on the parallel I/O capability of the stable storage. For example, in a stable storage in which the maximum beneficial queue depth is 4, calibration stops at queue depth 5. In other words, by employing this approach the calibration method stops whenever there is no point in continuing the method. The value of parameter T can be any arbitrary value that is experimentally sound.

Figure 5:
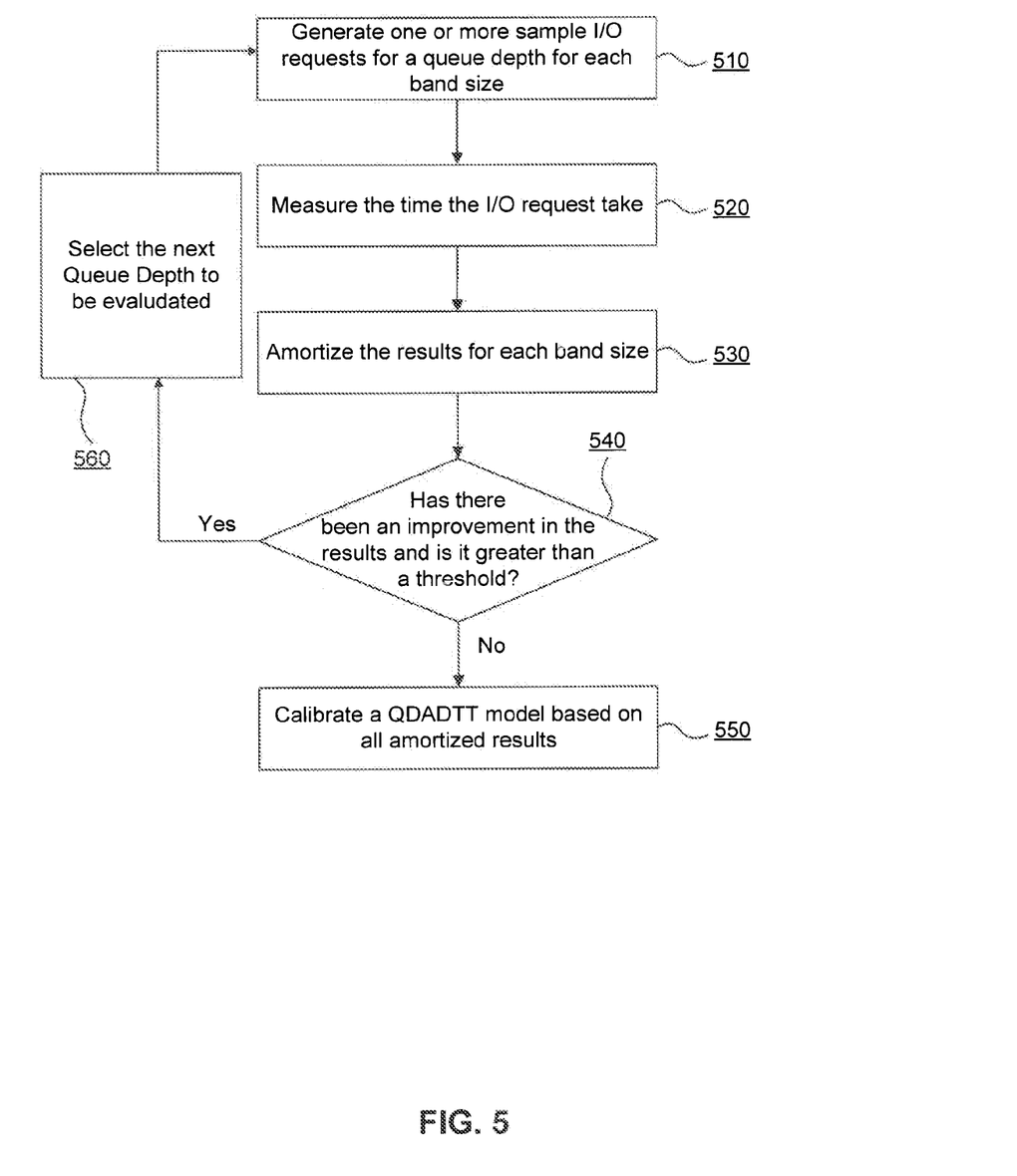
FIG. 5 is a flowchart illustrating an enhanced method for calibrating a QDADTT model, according to an example embodiment.

FIG. 5 is a flowchart illustrating an example method 500 for calibrating a QDADTT model, for example QDADTT model 202 illustrated in FIG. 2, using one or more I/O requests, according to an embodiment. Method 500 can be performed by processing logic that can comprise hardware (e.g., circuitry, dedicated logic, programmable logic, microcode, etc.), software (e.g., instructions run on a processing device), or a combination thereof.

Method 500 can be initiated in response to a specific command or during periods when no other active I/O processes are occurring.

FIG. 5 illustrates an iterative method, during which measuring results for completing I/O requests for different queue depths and amortizing the results is performed.

At operation 510, in an embodiment, an optimization module, for example optimization module 104 on central computer 102 illustrated in FIG. 1, generates one or more I/O requests to calibrate the QDADTT model for one or more selected queue depths. In an embodiment, the QDADTT model is calibrated for one queue depth in operation 510 and the I/O requests are selected based on having the same queue depth. For example, in an embodiment, the initial I/O requests may all have a queue depth of 1. This would indicate that each page access will be processed in order. In an embodiment, the QDADTT model is calibrated for more than one queue depth in operation 510 and the I/O requests are generated based on having the a queue depth in the range of selected queue depths. In an embodiment, the queue depth can be increased during each iteration, as discussed in more detail with regard to operation 540. The I/O requests can be generated based on one, multiple, or all band sizes available for a database file, for example database file 110 illustrated in FIG. 1.

At operation 520, in an embodiment, the optimization module measures the time a stable storage (e.g., I/O device) takes to complete one or more of the I/O requests for this iteration.

At operation 530, in an embodiment, the optimization module amortizes the measured I/O request time to determine the cost of a single page access for one or more band sizes for the selected one or more queue depths. In an embodiment, the optimization module determines the cost (e.g., the time to execute) of a single page access for the combination of each band size and each selected queue depth.

The amortized cost of a single page access is calculated by dividing the total I/O time by total number of pages accessed.

At operation 540, in an embodiment, the optimization module determines whether to continue generating calibration data. The determination can be based on whether there has been an improvement (e.g., a decrease in the time to execute) in the amortized results for the selected one or more queue depths, compared to measured and amortized results for I/O requests with lower queue depths. For example, the queue depth tested can be two, i.e., two I/O requests are issued concurrently. The optimization module can then determine if, once amortized, the results illustrate an improvement compared to prior I/O requests with a queue depth of one.

The optimization module can compare the results with a threshold to determine whether to run another iteration of the calibration operations 510, 520, and 530. For example, the threshold may be a percentage of improvement in time. For example, the threshold may be 10%, in order to continue generating calibration data. In another example, the threshold may be an amount of time. For example the threshold may be one millisecond. If there is at least a one millisecond improvement, the method will continue to generate calibration data. A person skilled in the art would understand that there are other types of thresholds that could be used to indicate whether there was an improvement in the I/O costs.

At operation 540, in an embodiment, if the optimization module determines to continue generating calibration data, the optimization module selects the next queue depth to be tested at operation 560 and generates one or more I/O request for the queue depth at operation 510. At operation 560, the optimization module can select the next queue depth by, for example, increasing the current queue depth by 1, doubling the queue depth, or increasing the queue depth in any other manner.

If, at operation 540, the optimization module determines to not continue generating calibration data, then at operation 550 in an embodiment, the optimization module calibrates a QDADTT model based on the amortization results from the executed iterations. In an embodiment where the amortization results include at least one result for each combination of band size and queue depth, the QDADTT model can be a lookup table that associates a band size and a queue depth with an amortized I/O cost to access a single page. Where not all band size and queue depth combinations have been tested, the remaining results may be estimated, for example by interpolation. In an embodiment, for queue depths that are greater than the last one tested, i.e., for queue depths greater than the last one that showed an improvement greater than a threshold, the results can be estimated. In an embodiment, the results for queue depths greater than the last one tested could be set to the same value as the amortized results for the last queue depth tested.

Figure 6:
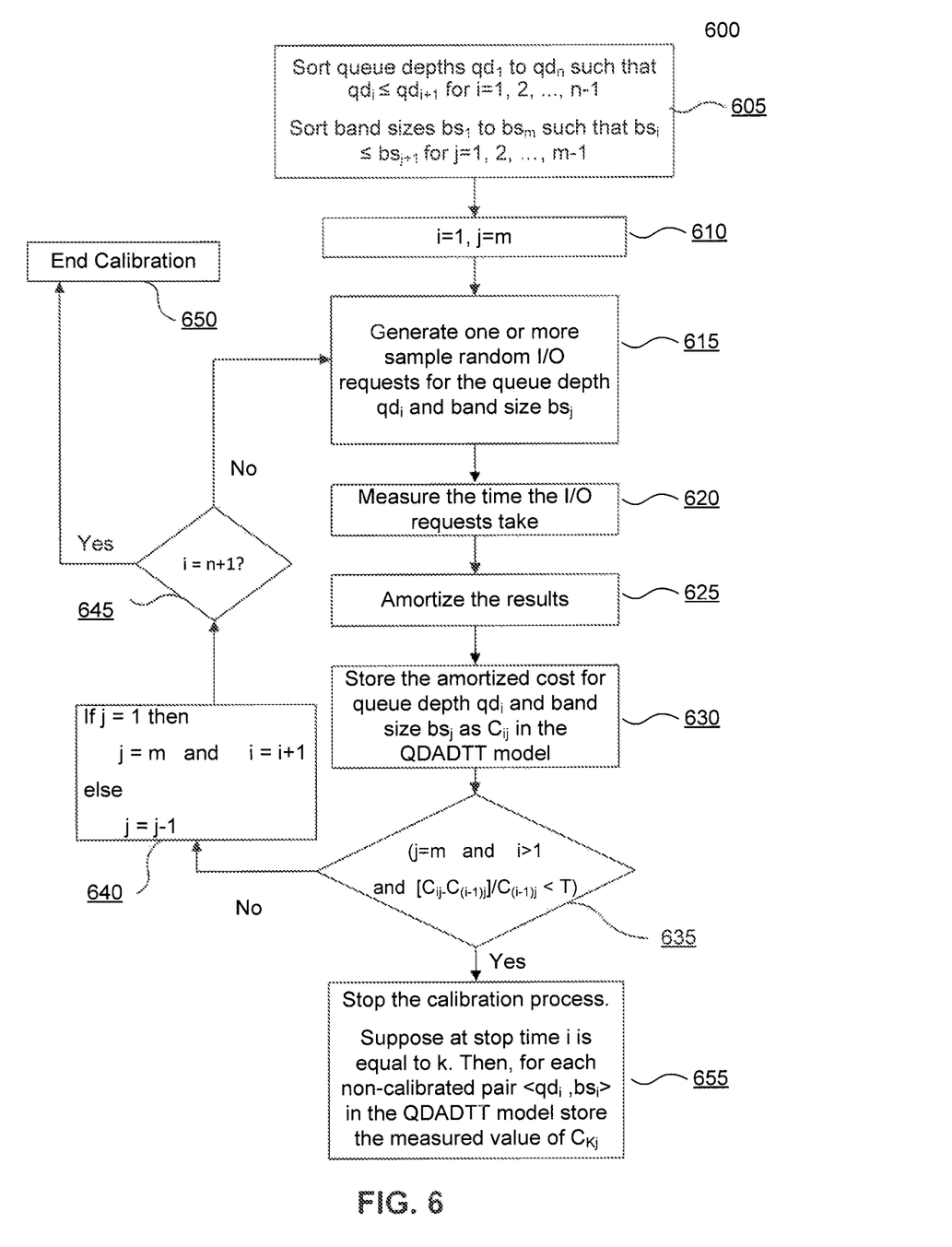
FIG. 6 is also a flowchart illustrating an enhanced method for calibrating a QDADTT model, according to an example embodiment.

FIG. 6 is a flowchart illustrating an example method 600 for calibrating a QDADTT model, for example QDADTT model 202 illustrated in FIG. 2, using one or more I/O requests, according to an embodiment. Once the QDADTT model is calibrated, the QDADTT model can be used to estimate the time required to execute an I/O request. Method 600 can be performed by processing logic that can comprise hardware (e.g., circuitry, dedicated logic, programmable logic, microcode, etc.), software (e.g., instructions run on a processing device), or a combination thereof.

The method illustrated in FIG. 6 can be initiated in response to a specific command or during periods when no other active I/O processes are occurring.

FIG. 6 illustrates an iterative method, during which measuring and amortizing I/O requests for different queue depths is performed.

At operation 605, in an embodiment, an optimization module, for example optimization module 104 on central computer 102 illustrated in FIG. 1, determines and sorts the queue depths and band sizes. For example, as illustrated in operation 605, the queue depths car be sorted from smallest to largest and the band sizes can be sorted from smallest to largest. The queue depths and band sizes can be received from the central computer.

At operation 610, in an embodiment, counters can be initialized. In one embodiment, there is a first counter that has values that correspond to various queue depth sizes, and there is a second counter that has values that correspond to various band sizes. For example, as illustrated in operation 610, two counters can be initialized. Each of the counters can be set to an initial value, for example 1. The values of the first counter (e.g., i) can point to corresponding queue depth sizes, for example that are stored in the queue depth array. The values for the second counter (e.g., j) can point to corresponding band sizes, for example that are stored in the band size array. Each of these counters can be set to an initial value. For example, the first counter (e.g., i) can be set to 1 to select the smallest queue depth in the queue depth array and the second counter (e.g., j) can be set to the value that will select the largest band size in the band size array.

At operation 615, in an embodiment, sample I/O requests can be generated. These requests use the queue depth (e.g., $qd_i$) pointed to by the first counter and the band size (e.g., $bs_j$) pointed to by the second pointer. For example, in the first iteration, as illustrated in FIG. 6, the queue depth may be the smallest queue depth received and the band size may be the largest band size received. In an embodiment a single I/O request can be generated. In another embodiment, the calibration can use multiple I/O requests generated using the same queue depth and band size.

At operation 620, in an embodiment, the time to complete each I/O request is measured. And in operation 625, in an embodiment, the measured times are amortized.

At operation 630, in an embodiment, the amortized results are stored. The results represent the cost, in time, to execute an I/O request with a queue depth pointed to by the first counter and a band size pointed to by the second counter. By storing the results, a table can be created that will enable modeling of the QDADTT model.

At operation 635, in an embodiment, if this is the first time the queue size in the first counter has been calibrated and this is not the first queue size evaluated, the results can be evaluated, and calibration can be stopped if the right conditions are met. For example, as illustrated in FIG. 6, if the band size for this calibration iteration is the largest band size received, it means this is the first time the queue size in the first counter has been calibrated (see operation 610, where the initial values were set). If the queue size is any queue size other than the smallest one, then there are some prior results that can be used to compare the results of this calibration iteration for the queue depth pointed to by the first counter. As illustrated in FIG. 6, if the change in the amortized cost for an I/O request with queue size designated by the received queue size pointed to be the first counter and with the maximum band size when compared to the amortized cost for an I/O request with queue size designated by the received queue smaller than the queue size pointed to by the first counter and with the maximum band size is below a threshold, then execution continues to operation 655, described below. If not, then execution continues to operation 640.

At operation 640, in an embodiment, the counters are incremented. If the second counter has reached the end of the band size array then the first counter is incremented and the second counter is reset to its initial value, for example m. If the second counter has not reached the end of the band size array, it is decremented and the first counter remains the same.

At operation 645, in an embodiment, the first counter is tested to determine if there are any queue depths that have not been tested. For example, as illustrated in FIG. 6, the first counter can be tested to see if it is equal to one more than the maximum queue depth. If that condition is false, there are additional queue depth/band size combinations to test, and the method returns to operation 615. If the condition is true, then all queue depth and band width combinations have been tested and amortized results have been stored. At this point the calibration is concluded at operation 650.

At operation 655, the method also ends, even though there are queue depth/band size combinations that have not been tested. At this point, operation 635 has determined that the increase in performance caused by increasing the queue depth is less than a threshold amount. Thus, the remaining non-calibrated points in the model are set to the same amortized cost as the last calibrated point that had the same band size.

The described calibration model measures the cost of I/O on a specific stable storage on a particular computer system. This gives the most accurate estimate of the cost of executing query operators on that configuration. However, the calibration operation requires a period of quiescence in order to calibrate the model. Even if the calibration has not been performed yet, the query optimizer still estimates the I/O costs for the execution plans that the query optimizer considers. In order to improve the accuracy of these estimations, a default model selection process is performed when a central computer is started without a stored calibration model. In default model selection, a very quick evaluation is used to select among a small number of stored QDADTT models that represent different device characteristics.

Figure 7:
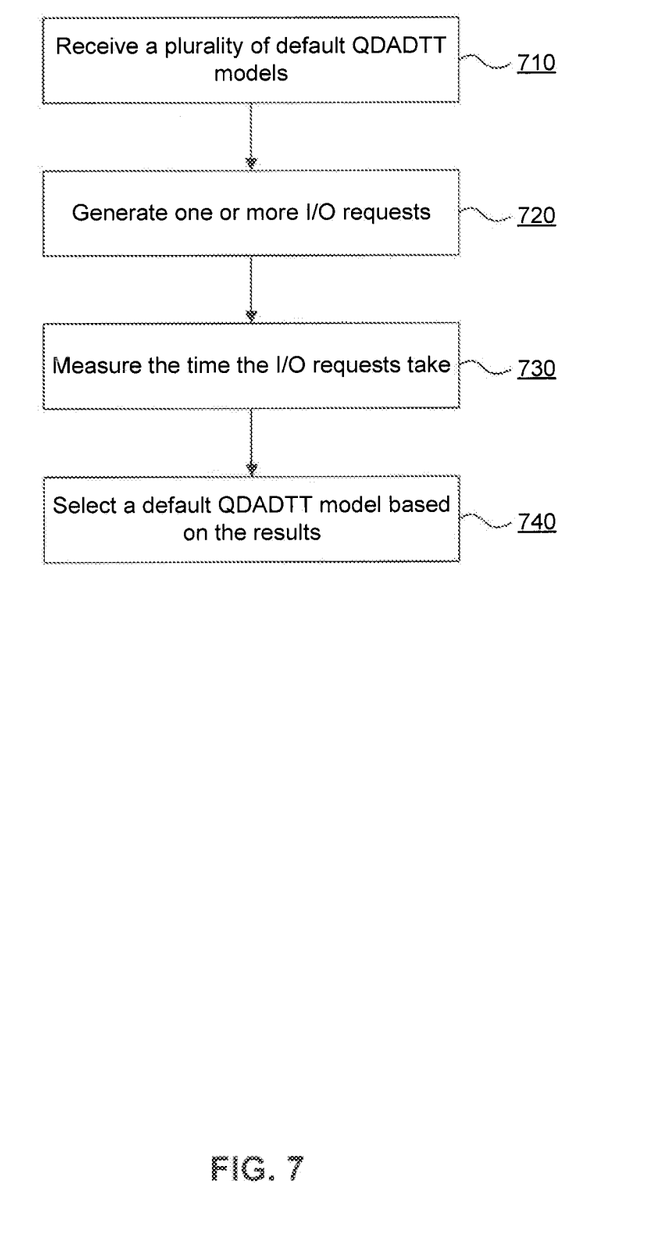
FIG. 7 is a flowchart illustrating a method for selecting a default QDADTT model, according to an example embodiment.

FIG. 7 is a flowchart illustrating a method for selecting a default QDADTT model, according to an example embodiment. FIG. 7 shows an example method 700 for selecting a default QDADTT model, for example QDADTT model 202 illustrated in FIG. 2, using one or more I/O requests. Once the default QDADTT model is selected, the QDADTT model can be used to estimate I/O costs for I/O requests. Method 700 can be performed by processing logic that can comprise hardware (e.g., circuitry, dedicated logic, programmable logic, microcode, etc.), software (e.g., instructions run on a processing device), or a combination thereof.

In an embodiment, the process illustrated in FIG. 7 can be executed relatively quickly, compared to the processes illustrated in FIGS. 3, 4, 5, and 6, and thus can be used to establish a default configuration of the QDADTT model until a more extensive calibration process can be performed. For example, when computer system 102 illustrated in FIG. 1 is initially turned on, computer system 102 can be configured to initially select among multiple default QDADTT models to estimate I/O costs until computer system 102 is able to calibrate a QDADTT model using a more extensive process.

At operation 710, in an embodiment, an optimization module, for example optimization module 104 on central computer 102 illustrated in FIG. 1, receives multiple default QDADTT models. In an embodiment, the optimization module may receive one or more of the multiple default QDADTT models from a central computer, for example central computer 102. In an embodiment, the optimization module may receive one or more of the multiple default QDADTT models from a third party, for example a manufacturer of a stable storage.

At operation 720, in an embodiment, an optimization module generates one or more I/O requests to calibrate the QDADTT model. In an embodiment, the one or more I/O requests can be generated in response to central computer 102 being powered up or optimization module 104 being initiated. In an embodiment, the I/O requests can be selected in order to differentiate between different default I/O models. For example, if there are two default I/O models, a small subset of I/O requests, or even a single I/O request, may be selected that can be used to determine which model most accurately models the one or more stable storage in use.

At operation 730, in an embodiment, the optimization module measures the I/O costs required to complete the selected I/O requests.

At operation 740, the measured results are used to select a default QDADTT model. For example, an optimization module can have two default QDADTT models, one that can handle up to four page reads in parallel and one that can handle up to 16 page reads in parallel. The optimization module may select two I/O requests, one that includes reads to four pages and one that includes reads to 16 pages. Based on the time for one or more stable storage to complete each of the two I/O requests, the optimization module can select a default QDADTT model.

In a specific embodiment, the model selection could select between two models, such as one that represents a HDD and one that represents an SSD.

In a specific embodiment, the default model selection is performed as follows. With a lightweight and conservative method, the underlying stable storage is tested to determine if the underlying stable storage is a SSD. If, with a high probability, the underlying stable storage is a SSD, then a model that represents a SSD is selected. Otherwise, a model that represents a HDD is selected.

The lightweight and conservative method is so termed because the method is based on only a limited number of random reads (for example 200 random reads) at database startup time. In order to minimize the impact of the device detection process on database startup time the number of reads should be minimal. In an embodiment, the detection process works based on the assumption that random I/O latency in SSD is less than 500 microsecond. This assumption is a conservative assumption because the latency of most SSDs in the market is less than 300 microseconds. However, one skilled in the relevant arts will appreciate that the latency assumption can be modified as required based on prevailing latency specifications.

Assuming the database file has N pages, the pages are read in the following order during the detection process: 0, N−1, 1, N−2, 2, N−3, 3, N−4, . . . , 99, N−100. This ordering maximizes the distance between reads to maximize the I/O latency on HDD. This approach also increases the gap between the I/O latency of SSD and HDD and consequently makes the device detection easier. In an embodiment, during the detection process, whenever the elapsed time for reading K pages becomes larger than a threshold, for example $K*(500+250)$ microseconds (i.e., 500 microseconds for the SSD to read a page plus a 250 microseconds buffer), the calibration process is stopped and it is assumed that the device type is HDD. In this example, the extra 250 microseconds per read is considered to make the stop condition more conservative and other values could be used. If the stop condition is reached, in an embodiment it is assumed that the costs to read K pages exceed the conservative estimate for accessing a SSD device, and thus the stable storage is an HDD device.

Employing this early stop policy improves the detection time significantly. The queue depth of the random I/O which is used in detection process is 1. This helps to detect the HDD Redundant Array of Independent Disks ("RAID") arrays with the same accuracy as detecting the single HDDs. In HDD RAID arrays of any arbitrary size the latency of the random I/O with queue depth one is equal to the latency of random I/O in a single HDD in that array. The explained method is only one possible approach for selecting the default model. Other possibilities for default model selection include using operating system information about the device characteristics or opportunistically monitoring I/O requests that are issued during normal operations.

Figure 8:
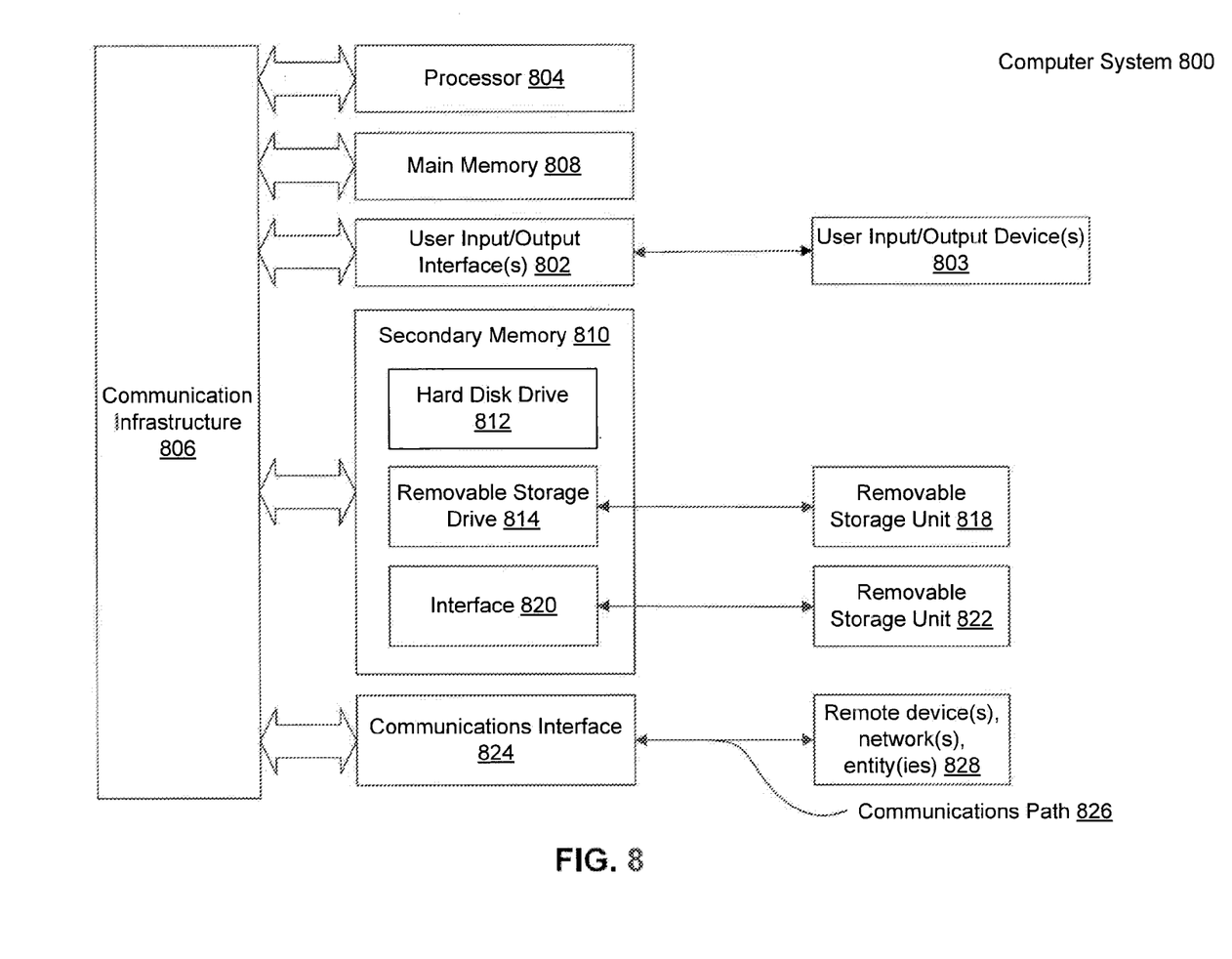
FIG. 8 is an example computer system useful for implementing various embodiments.

Various embodiments can be implemented, for example, using one or more well-known computer systems, such as computer system 800 shown in FIG. 8. Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 800 also includes user input/output device(s) 803, such as monitors, keyboards, pointing devices, etc., which communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, a solid-state drive (SSD) and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/or any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 626, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use the disclosed embodiments using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more, but not all, contemplated exemplary embodiments, and thus are rot intended to limit the disclosure or the appended claims in any way.

While the disclosure has beer described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope should not be limited by any of the above-described exemplary embodiments, but should be defined only in accordance with the following claims and their equivalents.

What is claimed is:

1. A method comprising:
   generating, by a central computer, an access request comprising a plurality of page accesses for a stable storage, including at least a first page access at a first queue depth and a second page access at a second queue depth;
   measuring a cost to execute the access request on the stable storage at both the first queue depth and the second queue depth, wherein the second queue depth is greater than the first queue depth;
   amortizing the cost over the plurality of page accesses;
   calibrating, by the central computer, a stable storage model based on the amortized cost; and comparing a first calibration point for the first queue depth to a second calibration point for the second queue depth to determine a calibration improvement measure, wherein a third page access at a third queue depth greater than the second queue depth is measured when the calibration improvement measure does not exceed a threshold.

2. The method of claim 1, wherein the access request includes a request for a plurality of queue depths at a plurality of band sizes.

3. The method of claim 1, wherein calibrating the stable storage model further comprises using interpolation to estimate the access cost for a queue depth/band size combination of non-calibrated points.

4. The method of claim 1, wherein calibrating the stable storage model further comprises using bilinear interpolation to estimate the access cost for a queue depth/band size combination of non-calibrated points.

5. The method of claim 1, wherein calibrating the stable storage model comprises selecting a default stable storage model from a plurality of default stable storage models.

6. The method of claim 5, wherein the plurality of default stable storage models includes a model for a solid state device (SSD) and a model for a hard disk drive (HDD).

7. The method of claim 1, wherein the comparing comprises: determining if the amortized cost including the third queue depth improved by comparing the amortized cost to the previously calculated amortized cost for the first and second queue depths.

8. The method of claim 1, wherein the third calibration request is not measured when the calibration does not exceed the threshold and the calibrating completes.

9. The method of claim 1, wherein the measuring is performed when no other background processes are running.

10. A computer-readable device having instructions stored thereon, execution of which, by a computing device, causes the computing device to perform operations comprising:
receiving a queue depth and a band size associated with an access request comprising a plurality of page accesses for a stable storage, including at least a first page access at a first queue depth and a second page access at a second queue depth;
measuring a cost to execute the access request at both the first queue depth and the second queue depth, wherein the second queue depth is greater than the first queue depth;
amortizing the cost over the plurality of page accesses for the first and second queue depths;
comparing a first calibration point for the first queue depth to a second calibration point for the second queue depth to determine a calibration improvement measure, wherein a third page access at a third queue depth greater than the second queue depth is measured when the calibration improvement measure does not exceed a threshold;
calibrating a stable storage model based on the amortized cost; and
determining an estimated access cost for the access request based on the amortized cost for the first and second access requests and the stable storage model.

11. The computer-readable device of claim 10, wherein the determining comprises identifying the estimated access cost in a table.

12. The computer-readable device of claim 10, wherein the determining comprises interpolating calibrated estimate access costs to determine the estimated access cost.

13. The computer-readable device of claim 12, wherein the interpolation is bilinear interpolation.

14. The computer-readable device of claim 10, wherein the device is further configured to perform operations comprising: calibrating a model based on the amortized cost, wherein the calibrating comprises comparing a first calibration point for the first access request to a second calibration point for the second access request to determine a calibration improvement measure, wherein a third access request at a third queue depth greater than the second queue depth is measured when the calibration improvement does not exceed a threshold.

15. A system comprising:
a stable storage configured to store a database file;
an optimization module, in communication with the stable storage, configured to:
determine an amortized cost of an access request made to the database file comprising a plurality of page accesses for a stable storage, including at least a first page access at a first queue depth and a second page access at a second queue depth;
measure a cost to execute the access request at both the first queue depth and the second queue depth, wherein the second queue depth is greater than the first queue depth;
amortize the cost over the plurality of page accesses for the first and second queue depths;
compare a first calibration point for the first queue depth to a second calibration point for the second queue depth to determine a calibration improvement measure, wherein a third page access at a third queue depth greater than the second queue depth is measured when the calibration improvement measure does not exceed a threshold; and
calibrate a stable storage model based on the amortized cost; and
an access module, in communication with the optimization module and the stable storage, configured to submit Input/Output (I/O) requests to the database file based on the amortized cost.

16. The system of claim 15, wherein the access module is configured to maintain a plurality of execution plans indicating how I/O requests are to be submitted to the database file.

17. The system of claim 16, wherein the access module is further configured to select an execution plan based on the amortized cost.

18. The system of claim 15, wherein the access model is configured to access a plurality of default stable storage models.

19. The system of claim 18, wherein the access model is further configured to select a stable storage model from the plurality of default stable storage modes based on the amortized cost and to select an execution plan based on the selected stable storage model.

20. The system of claim 15, further comprising a calibration unit configured to: calibrate a model based on the amortized cost, wherein the calibrating comprises comparing a first calibration point for a first access request to a second calibration point for a second access request to determine a calibration improvement measure, wherein a third access request at a third queue depth greater than the second queue depth is measured when the calibration improvement does not exceed a threshold.

* * * * *